United States Patent [19]

George et al.

[11] Patent Number: 5,734,466
[45] Date of Patent: Mar. 31, 1998

[54] ALIGNMENT, CODE AND POWER TEST OF AIRBORNE LASER DESIGNATORS

[75] Inventors: Edwin B. George, Fort Walton Beach; Steven A. Marlow, Niceville, both of Fla.

[73] Assignee: The United States of America as represented by the Secretary of the Air Force, Washington, D.C.

[21] Appl. No.: 534,798

[22] Filed: Sep. 27, 1995

[51] Int. Cl.⁶ ............................. G01B 11/26; G01J 05/02
[52] U.S. Cl. ................. 356/141.3; 356/138; 250/342
[58] Field of Search ........................... 356/141.1, 138; 250/342

[56] References Cited

U.S. PATENT DOCUMENTS

| | | | |
|---|---|---|---|
| 4,422,758 | 12/1983 | Godfrey et al. | 356/152 |
| 5,088,868 | 2/1992 | Nicholson | 356/152 |
| 5,251,003 | 10/1993 | Vigouroux et al. | 356/152 |
| 5,506,675 | 4/1996 | Lopez et al. | 356/152.1 |

*Primary Examiner*—Mark Hellner
*Attorney, Agent, or Firm*—Sverdrup Technology Inc.

[57] ABSTRACT

This invention relates to laser guided weapon systems and in particular to boresighting a designator laser to a forward looking infrared (FLIR) sighting system that is at a wavelength other than that of the laser with sufficient accuracy, confirming adequate power level available for designation and that the proper pulse rate code has been selected and is being transmitted. Due to the nature of the designation laser being at a different bandwidth than the FLIR, the positioning of the laser spot is not visible to the targeting system and the initial system alignment is depended on for accuracy and precision. This invention presents a way of addressing three aspects of laser designation prior to weapon use. This is achieved through the use of a beamsplitter and thermal resistor that appear to be at the same point of space to the targeting system. The offsets are measured and then used to correct the misalignment.

5 Claims, 3 Drawing Sheets

ALIGNMENT, CODE AND POWER TEST OF AIRBORNE LASER DESIGNATORS

BACKGROUND/DESCRIPTION OF THE PRIOR ART

The first generation of airborne laser designators required the use of a weapons system operator to manually track the target. The second generation of laser designators employed the use of automatic target trackers. The target is identified by a sighting system on the aircraft, typically a television or infrared camera, maintaining the aim of the laser beam on the target is performed automatically by a closed loop tracking system. This system allows the guidance of missiles by a laser homing device as a missile seeker. Two major potential sources of error in laser guided weapon systems is boresight misalignment between the laser designating the target and the sighting system used to aim the weapon at the target and a mismatch between the pulse rate frequency of the laser and the pulse rate frequency the weapon is expecting the laser to transmit. Existing boresighting systems address the issue of aligning the laser optical axis with the sighting optical axis but do not determine if adequate laser power is available for illuminating the target or if the pulse rate frequency is set correctly. U.S. Pat No. 4,422,758, U.S. Pat No. 5,007,736, and U.S. Pat. No. 5,5251,003 all address boresighting issues but do not provide methods for power or code verification. U.S. Pat. No. 4,422,758 uses an optical system to focus the laser energy on to a refractory ceramic which heats and radiates, this radiation is collimated and sent to the sighting system for alignment. The major drawbacks associated with U.S. Pat. No. 4,422,758 resides in only one error source is addressed by the device, another drawback is driven by the use of materials employed in the operation of the device. Refractory ceramics require significant amounts of energy resulting in long aliment test times. Another drawback is the complex optical system resulting in potential errors in parallelism. U.S. Pat. No. 5,251,003 uses a polymide film heated by focused laser energy, the radiation from the film is collimated and sent to the sighting system for alignment. The major drawback with this device is it addresses only one error source, alignment. Another drawback is the polymide film, the thermal spot size and centroid of the spot will be determined by the film material, thickness and condition. The energy density of the spot on the film is dependent upon thermal characteristics of the film and laser mode structure could shift the alignment point introducing error. U.S. Pat. No. 5,007,736 uses digital computer and code to provide error signals and automatically correct for alignment errors based on position between the laser pod and aircraft. The major drawback for this device is it addresses only one error source, alignment. Other drawbacks include no methodology for in flight alignment error measurement. U.S. Pat. No. 5,506,675 is a more complex system that requires image/fpa acquisition and processing rather than a simple intensity detector and does not address power or pulse code validity.

Thus, it is desirable to have a system that addresses all potential sources of error in laser designator system, boresight alignment, power level and pulse code.

OBJECTS AND ADVANTAGES

It is an object of this invention to boresight the laser with the aircraft targeting system. Another object of this invention is to verify that the laser power level is sufficient to designate the selected target. It is a further object of this invention to compare the code setting on the weapon with the code setting on the laser designator. Yet another object of this invention is to provide the capability of testing the designation system prior to use. This invention addresses all major sources of error encountered in laser designation systems. Previous systems addressed only the boresight problem, typically without success. This concept is simple and based on precise mechanical alignment performed when the unit is assembled.

DRAWINGS AND FIGURES

The invention will be better understood and advantages will become apparent to those skilled in the art on reading the description which follows with reference to the attached figures respectively representing:

REFERENCE NUMBER GLOSSARY

Figure 1:
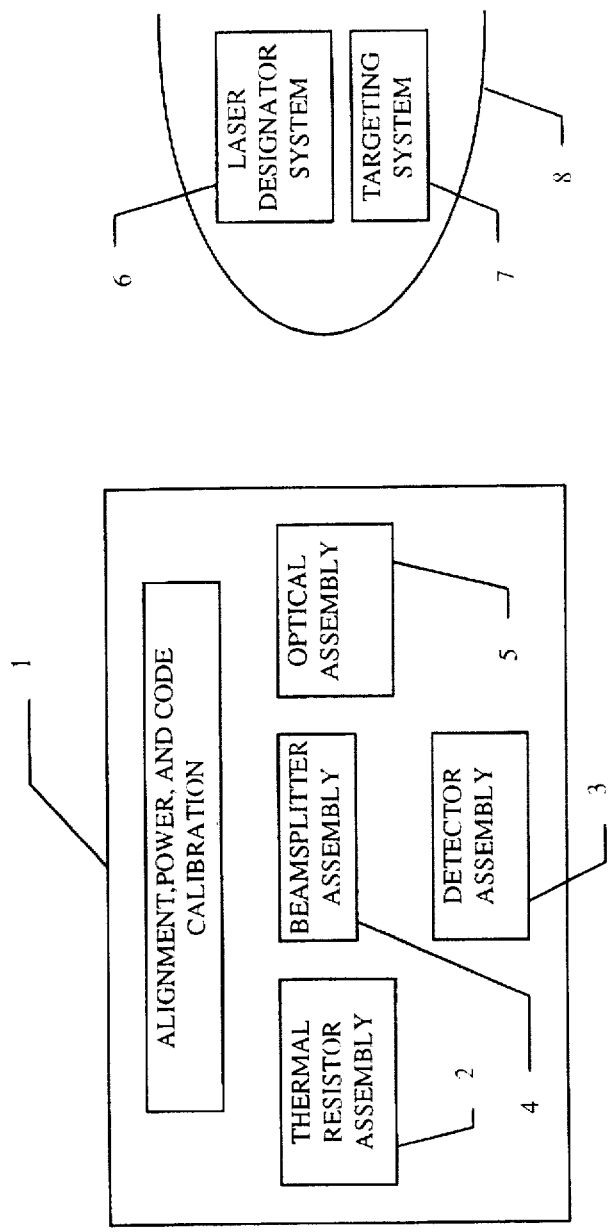
FIG. 1 is the general installation diagram of the system according to the invention.

1 Alignment, power and code calibration device
2 thermal resistor single element assembly
3 detector assembly
4 beam assembly
5 optical assembly
6 laser designator
7 targeting system
8 targeting and laser designator pod assembly
9 detector
10 thermal resistor element
11 lens
12 lens
13 lens
14 iris
15 measured laser power as a function of time
16 comparison of measured laser power to required laser power
17 measured laser power below required laser power error message sent to BIT of designator system
18 measured laser pulse rate compared to weapon selected pulse rate
19 measured laser code different from weapon code error message sent to BIT of designator system
20 Pass BIT message sent to laser designator system
21 Operator selected weapon code
22 comparison memory
23 Laser alignment sensitivity signal
24 Test controller
25 Power threshold
26 Laser pointing command
27 Laser correction determination
28 laser alignment bias commands

INVENTION DESCRIPTION

Figure 2:
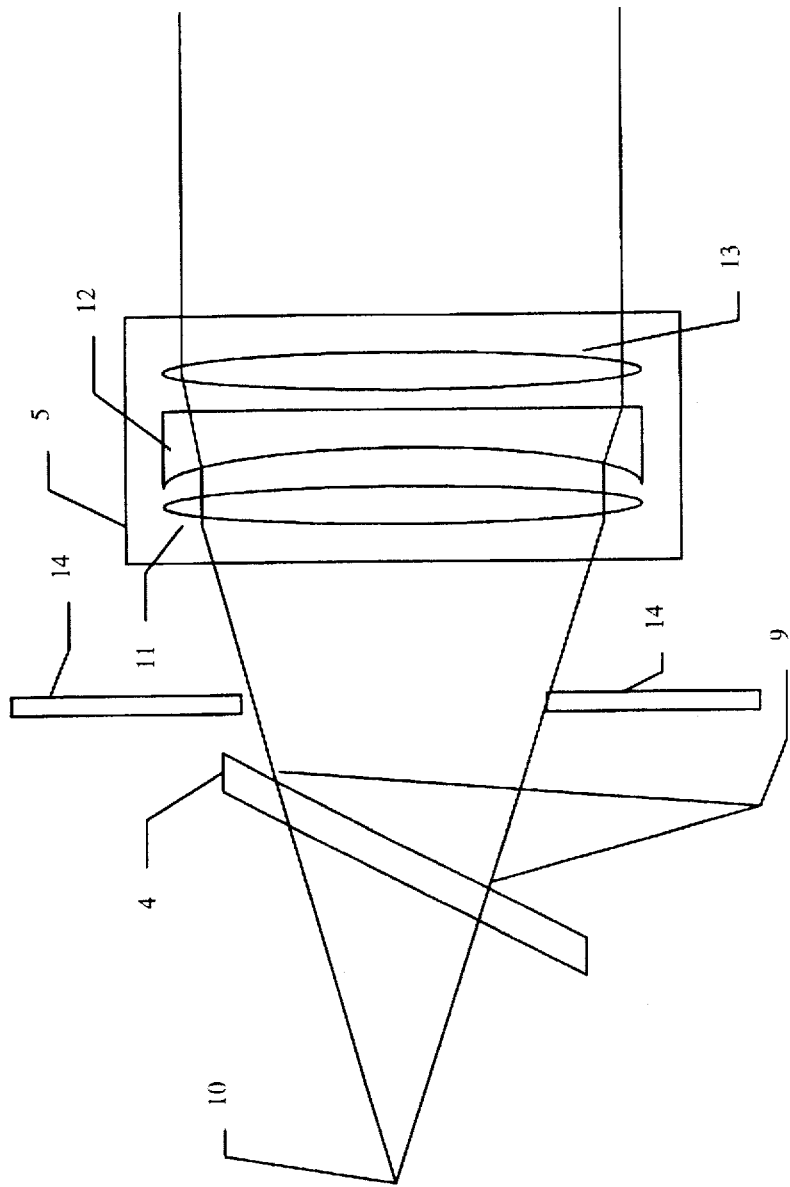
FIG. 2 is the optical path of the laser and infrared targeting system beams.
Figure 3:
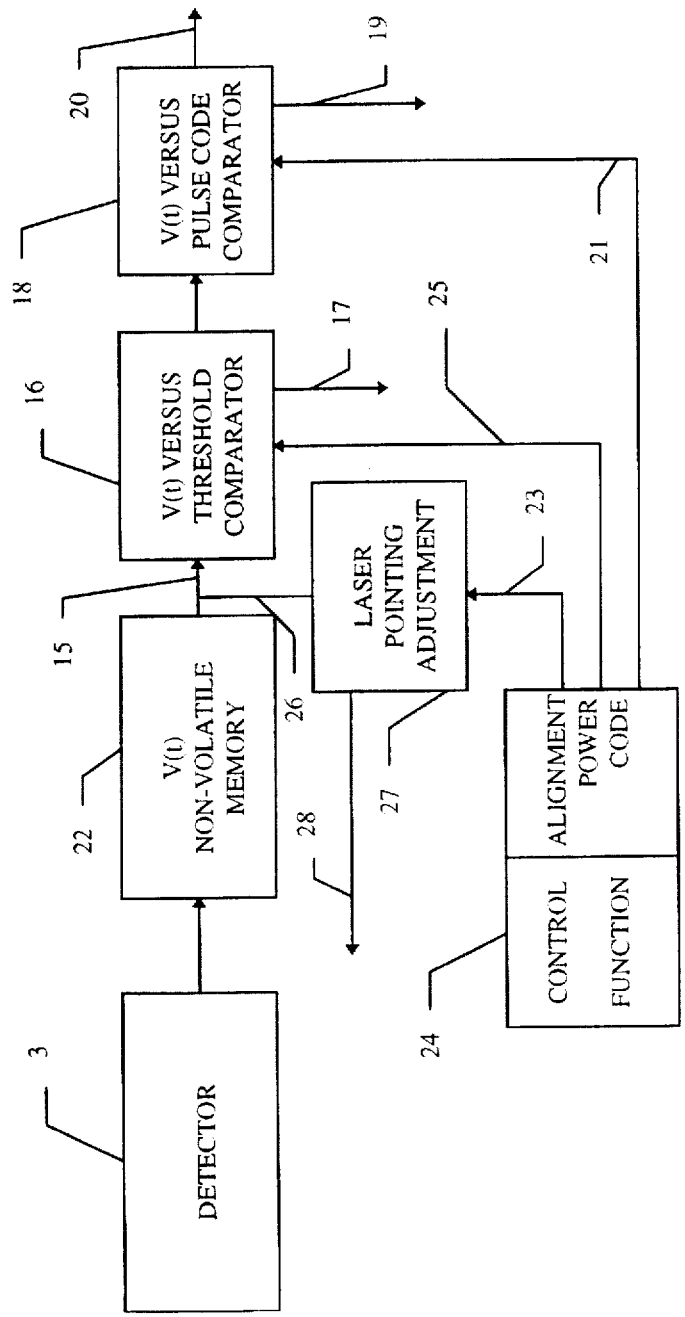
FIG. 3 is a block diagram describing the digital processing to provide laser power verification and pulse code verification.

FIG. 1 illustrates the installation diagram of the alignment, power and code calibration system 1 according to the invention for testing a laser designation "pod" 8 the pod represents a targeting/tracking system 7 containing an optical system and a laser designator 6. The beamsplitter 4 allows the thermal resistor assembly 2 and the detector assembly 3 to be located on the same optical line-of-sight in the view of the 7 targeting system. The path of the beam is directed from the designator 6 into the 5 optical assembly. The thermal resistor emitter 10 is heated to incandescence and radiates through the beamsplitter 4 to the optical assembly 5 which collimates the energy and projects the radiation into the targeting system 7. The laser designator 6 is turned on and the weapon pulse code selected. The laser beam from the laser designator system 6 is collected and focused by the optical assembly 5 onto the detector 3,9 for evaluation. The targeting and laser pod is now repositioned with the laser 6 focused by the lenses 12,13,14 and adjusted until maximum energy is transmitted through the iris 14 and onto the detector 9. The offset in azimuth and elevation is determined by a small nutation, FIG. 3, of the laser that generates a sensitivity or gradient that is used to maximize the energy at the detector 3,9. This sensitivity is used to offset the laser 0,0 until a maximum laser energy is received by the detector. The nutation 27 and repositioning 26 is repeated until there is no further increase in received laser energy. The lens assembly 11, 12, and 13 of FIG. 2, provides collimated output energy from the thermal resistor assembly 2 so that the heated resistor is in view of the targeting system 7. The targeting system 7 can read the azimuth and elevation offset of the heated resistor 10 that is in the waveband of the targeting system 7 and is at the same apparent point in space as the laser beam 6 relative to a 0,0 position on the line-of-sight. These azimuth and elevation biases 28 can be stored to adjust the laser 6 to the true line-of-sight position of the targeting system 7. To minimize the errors associated with the initial alignment of the elements not common to both paths in the calibration system 1 and therefore insure a common line-of-sight the number of non-common elements have been kept to a minimum. The detector 9 and the thermal resistor 10 are the only elements not common, but are aligned and mechanically fixed, by use of a precision optical bench on manufacture, on the same optical line-of-sight once combined by the beamsplitter/combiner 4.

OPERATION

This device addresses a basic problem in using different wavelengths for illumination and detection. This device can be used prior to departure on a mission as a ground test article or has the potential to be built into the hardware so that end to end testing could be accomplished prior to employment. The optical assembly is designed so that the two beams from the beam splitter are focused at the detector assembly for the split beam and on the incandescent resistor for the beam through the splitter. When the targeting system is moved until energy received at the detector is maximized the laser beam is directed at the same point in space as the resistor due to the precise optical alignment of the resistor, beam splitter, detector and optical assembly. Both the laser and the FLIR then see the same point in space, at least to the accuracies of the initial alignment of the detector and the resistor which are accomplished on an optical bench. The offset of the FLIR center from the incandescent resistor after the laser is then adjusted for maximal energy receipt at the detector is the laser alignment offset. The maximizing of the laser energy at the detector can either be accomplished by a closed loop control system that generates sensitivities or my a manual control. The resultant biases between the FLIR center and the location of the heated resistor in the FLIR field of view are maintained for subsequent use in offsetting the laser for proper position designation. The laser beam may be further examined to assure exceedance of a required power threshold. In addition the detector is capable of receiving the transmitted code so that all primary functions of the system are verified.

SUMMARY, RAMIFICATIONS, AND SCOPE

This device can successfully examine and verify all primary functions of a FLIR augmented laser designation system.

Thus the scope of the invention should be determined by the appended claims and their legal equivalents, rather than by the examples given.

What is claimed as new and desired to be secured by Letters of Patent of the United States is:

1. An apparatus for testing and aligning a laser target designator, said laser target designator including a laser for radiating a laser beam along a beam optical axis, a target image detector for viewing an image in a field of view which contains the target and into which said laser beam extends along said beam optical axis, servo means for moving said laser and target image detector together as well as a means to make alignment adjustments between said laser and said target image detector, along with image processing for tracking said servo means to a target in said field of view, said apparatus for field testing and alignment comprising:

an optical assembly containing an aperture that will both focus the incoming laser light and limit laser energy passing through the optical assembly so that a maximum will be achieved when the laser beam is centered on the aperture;

a beam splitter assembly optically positioned so that a laser detector assembly, positioned at the split optical focus, will detect maximum energy when the beam is fully on the optical assembly while the remaining energy is focused at a thermal resistor assembly all optically positioned so that both the laser detector assembly and the thermal resistor assembly appear at the same point in space in the view of the said laser target designator image processing;

said thermal resistor assembly positioned at the focus of the beam passing through the beam splitter; and a signal processing assembly to provide designation intensity, determine laser designation code, and misalignment between said laser and said target image detector.

2. The apparatus of claim 1 wherein said signal processing assembly provides a means of centering the said laser beam through use of said laser servo on the said detector assembly resulting in azimuth and elevation corrections in the two dimensional said laser target designator image plane that can be used as correction angles for the laser pointing since the resistor assembly that is visible to the said laser target designator and appears at the same point in space through which the laser beam passes.

3. The apparatus of claim 1 signal processing assembly further consists of a means of determining said laser intensity, interpretation of the said designation code, and a means of centering the said laser beam on the said optical assembly through the use of said servo.

4. The said means of centering the laser on the said optical assembly as recited by claim 3 with consisting of means to command said laser servo so that said signal processing detects changes of intensity to generate sensitivities or gradients that will lead to maximization of the laser energy on the said detector assembly and result in the said azimuth and elevation corrections required for said correction of said laser beam pointing.

5. The apparatus of claim 1 including means to integrate the device into an aircraft in view of the targeting pod for in-flight calibration and alignment of the said laser target designator or used as a ground test device prior to flight or for periodic test and alignment of the said laser target designator.

* * * * *